US008306735B2

(12) United States Patent
Mudalige et al.

(10) Patent No.: US 8,306,735 B2
(45) Date of Patent: Nov. 6, 2012

(54) SYSTEM AND METHOD FOR MANAGING GEOGRAPHICAL MAPLET DOWNLOADS FOR A VEHICLE TO SUPPORT STOP SIGN VIOLATION ASSIST AND SIMILAR APPLICATIONS

(75) Inventors: Upali Priyantha Mudalige, Troy, MI (US); Steven C. Tengler, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 693 days.

(21) Appl. No.: 12/503,114

(22) Filed: Jul. 15, 2009

(65) Prior Publication Data

US 2011/0015854 A1 Jan. 20, 2011

(51) Int. Cl.
*G01C 21/36* (2006.01)

(52) U.S. Cl. .................................... 701/409; 340/995.1

(58) Field of Classification Search .................. 701/201, 701/408, 409; 340/995.2, 995.12, 995.1, 340/995.14, 995.18; G01C 21/36
See application file for complete search history.

(56) References Cited

U.S. PATENT DOCUMENTS

| | | | |
|---|---|---|---|
| 6,178,374 B1 * | 1/2001 | Mohlenkamp et al. | 701/117 |
| 6,263,276 B1 * | 7/2001 | Yokoyama et al. | 701/420 |
| 6,295,492 B1 * | 9/2001 | Lang et al. | 701/32.4 |
| 6,338,021 B1 * | 1/2002 | Yagyu et al. | 701/533 |
| 6,487,493 B2 * | 11/2002 | Uekawa et al. | 701/520 |
| 6,671,615 B1 * | 12/2003 | Becker et al. | 701/516 |
| 7,433,889 B1 * | 10/2008 | Barton | 1/1 |
| 8,145,414 B2 * | 3/2012 | Fushiki et al. | 701/119 |
| 8,170,791 B1 * | 5/2012 | Bellesfield et al. | 701/409 |
| 8,185,306 B2 * | 5/2012 | Adachi | 701/451 |
| 8,200,423 B2 * | 6/2012 | Dietsch et al. | 701/409 |
| 8,209,120 B2 * | 6/2012 | Breed | 701/450 |
| 2003/0078726 A1 * | 4/2003 | Fukushima et al. | 701/209 |
| 2004/0196163 A1 * | 10/2004 | Takenaga et al. | 340/995.12 |
| 2006/0181433 A1 * | 8/2006 | Wolterman | 340/917 |
| 2006/0262312 A1 * | 11/2006 | Retterath et al. | 356/445 |
| 2006/0282214 A1 * | 12/2006 | Wolterman | 701/208 |
| 2008/0114542 A1 * | 5/2008 | Nambata et al. | 701/209 |
| 2008/0157945 A1 * | 7/2008 | Bowler | 340/433 |
| 2008/0198043 A1 * | 8/2008 | Adachi | 340/995.12 |
| 2008/0288165 A1 * | 11/2008 | Suomela et al. | 701/201 |
| 2009/0295604 A1 * | 12/2009 | Denaro | 340/988 |

* cited by examiner

*Primary Examiner* — Tuan C. To

(57) ABSTRACT

A method is provided for managing map data for intersections having stop sign indicators. A request is initiated for turn-by-turn navigation instructions for a destination from a vehicle to an infrastructure. A turn-by-turn navigation maplet is transmitted from the infrastructure to the vehicle. A geographical region associated with the received turn-by-turn navigation maplet is identified. A determination is made whether stop sign locations already retained within a memory of the vehicle relate to the identified geographical region. The vehicle on-board device requests stop sign maplets for the identified geographical regions from the infrastructure if the stop sign locations retained within the memory of the vehicle do not relate to the identified geographical region. The stop sign maplets are transmitted for the identified geographical region from the infrastructure to the vehicle. The stop sign maplets relate to stop sign intersection data within the identified geographical region.

25 Claims, 4 Drawing Sheets

SYSTEM AND METHOD FOR MANAGING GEOGRAPHICAL MAPLET DOWNLOADS FOR A VEHICLE TO SUPPORT STOP SIGN VIOLATION ASSIST AND SIMILAR APPLICATIONS

BACKGROUND OF INVENTION

An embodiment relates generally to stop sign assistance and other application routines, and more specifically, to managing stop sign maplets and similar geographical information within a vehicle.

Active safety and driver assistance features typically use a combination of multiple driver alert warning modalities to provide optimum and effective alerts to the driver of a vehicle in a timely manner. The timing of such alert modalities plays an important role in determining the effectiveness and user acceptance of these features. Such modalities utilize map data to determine the location of the vehicle in relation to a location of the safety event for determining whether the vehicle is affected by the safety event. Unless a vehicle already has the necessary map data stored in memory, large amounts of map data must be transferred between the infrastructure and the vehicle in particular when the map data of another geographical layout of roadways is required. Some navigation route assistance systems, such as OnStar®, provide turn-by-turn directions to the vehicle upon request. OnStar® does not require that the vehicle have a navigation device or have preloaded map data stored within the vehicle. Rather, OnStar® monitors the location of the vehicle and provides turn-by-turn directions to the vehicle. Any additional map data that may be required in addition to the turn-by-turn directions are downloaded after the request is initiated and purged once the vehicle has reached its destination. However, the continuous download of large amounts of information is time consuming and costly.

SUMMARY OF INVENTION

An advantage of an embodiment is the optimization of managing stop sign maplet downloads from an infrastructure to a vehicle, the stop sign maplets includes, but is not limited to, stop sign map data, speed limit data, and other data relating to the stopping location. A vehicle manages stored maplet data within a vehicle memory by retaining stop sign map data and other associated data if respective criteria is met, otherwise stop sign map data and other associated data is discarded from memory when the respective criteria is no longer met. As a result, respective stop sign maplets are downloaded with turn-by-turn directions only if the respective stop sign maplets are not currently retained in the memory of the vehicle.

An embodiment contemplates a method of managing map data for intersections having stop sign indicators. A request is initiated for turn-by-turn navigation instructions for a destination from a vehicle to an infrastructure. A turn-by-turn navigation maplet is transmitted from the infrastructure to the vehicle. A geographical region associated with the received turn-by-turn navigation maplet is identified. A determination is made whether stop sign locations already retained within a memory of the vehicle relate to the identified geographical region. The vehicle on-board device requests stop sign maplets for the identified geographical regions from the infrastructure if the stop sign locations retained within the memory of the vehicle do not relate to the identified geographical region. The stop sign maplets are transmitted for the identified geographical region from the infrastructure to the vehicle. The stop sign maplets relate to stop sign intersection data within the identified geographical region.

An embodiment contemplates a system for managing map data for intersections having stop sign indicators. An infrastructure has a communication system for communicating with vehicles over a wireless communication network. The infrastructure is capable of maintaining a global position of vehicles within the wireless communication network. The infrastructure provides turn-by-turn navigation assistance to vehicles in the wireless communication network. A vehicle has an on-board device for communicating with the infrastructure over the wireless communication network. The on-board device enables a communication channel with the infrastructure for requesting the turn-by-turn navigation assistance. The on-board navigation device further processes turn-by-turn navigation data received from the infrastructure. The on-board device receives a turn-by-turn navigation maplet from the infrastructure. The on-board device identifies a geographical region associated with the received turn-by-turn navigation maplet. The processor determines whether stop sign location maplets already retained within a memory of the vehicle relates to the identified geographical region. The vehicle on-board device requests stop sign maplets for the identified geographical regions from the infrastructure if the stop sign location maplets retained within the memory of the vehicle do not relate to the identified geographical region. The stop sign maplets for the identified geographical region is transmitted from the infrastructure to the on-board device.

DETAILED DESCRIPTION

Figure 1:
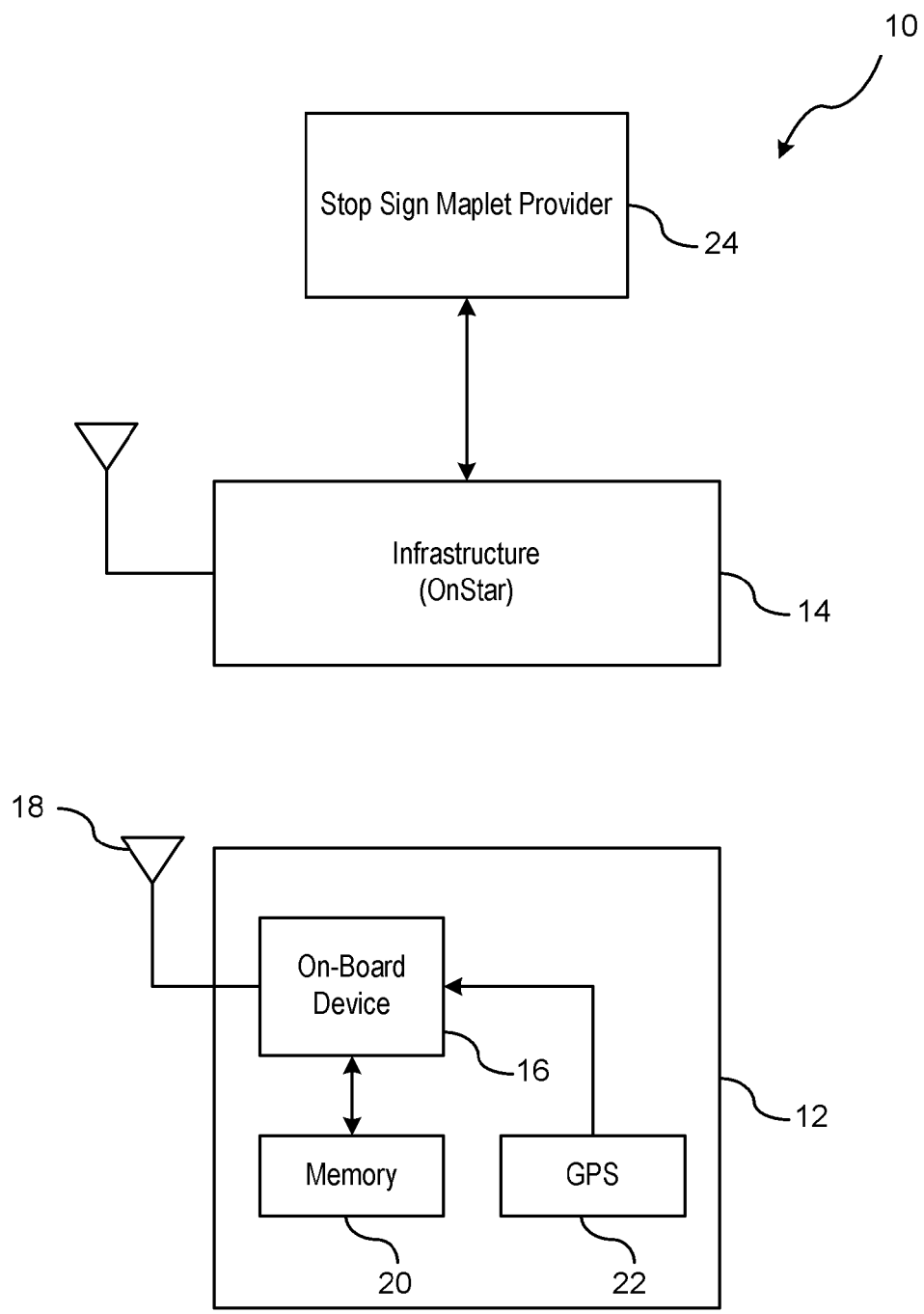
FIG. 1 is a block diagram of a system for managing stop sign maplet data according to an embodiment of the invention.

There is shown in FIG. 1, generally at 10, a system for managing a download of map data for stop sign intersection between a vehicle 12 and an infrastructure 14. The map data for stop sign intersection includes stops sign locations, map data of the approaching intersection, the designated stopping location of the approaching intersection, and the speed limit data of the traveled road, and other respective data associated with the stop sign intersection. It should also be understood that the term stop sign includes, but is not limited to, stop signal markings/indicators such as railroad crossing markings, yield signs, and a pedestrian crossing markings. In addition to the stop sign intersection data, road information such as curve locations, curve speed limits, and 1-way road information are also provided. The vehicle 12 is equipped with a stop sign assistance routine or signal violation warning routine which analyzes the vehicle speed and distance to a stopping location at a stop sign intersection and determines whether the vehicle speed violates a threshold for stopping the vehicle at the stop sign intersection. A stop sign alert warning is enabled if the routine determines that the vehicle exceeds the threshold. Other signal violation warning routines may include, but is not limited to, curve speed driver assistant routines which utilize map data and speed limit data of a curved roadway.

The infrastructure 14 is a fixed entity that remotely provides vehicle service assistance to the vehicle 12. An example of such an infrastructure is Onstar® which is a subscription-based communications service currently provided on vehicles manufactured by General Motors. Some of the communications services provided include in-vehicle security, remote diagnostics systems, and turn-by-turn navigation. For the service of providing turn-by-turn navigation instructions at the request of the vehicle, turn-by-turn navigation assistance is provided to the driver of the vehicle. Under such a system, the vehicle does not require map data or a navigation device as the turn-by-turn instructions are spoken to a driver of the vehicle 12. However, for the stop sign assistance routine, stop sign intersection map data is required by the stop sign assistance routine for determining whether the vehicle is in violation of not stopping the vehicle at the stopping location at the intersection. Storing stop sign map data and other associated data for intersections for a geographical location (e.g., city, state, country) is costly as it requires a large amount of memory to store such data especially given the size of the geographical location. Therefore, the embodiments described herein manage the downloading of stop sign maplets by maintaining certain stop sign maplets and other associated data in the vehicle memory for a duration of time if certain requirements are met and request only those stop sign maplets and other associated data from the infrastructure that are not retained by the vehicle. Stop sign maplets and other associated data includes, but is not limited to, map data, GPS coordinates (latitude, longitude, altitude), direction of relevancy (i.e., what GPS heading pertains to the stop sign or curve), duration of relevancy (i.e., expiration timing should the stop sign data need to be downloaded if still applicable to avoid the need for revocation), radius of relevancy (i.e., curve radius to support curve speed advisory).

The vehicle 12 includes an on-board device 16 for communicating with the infrastructure 14. The on-board device 16 receives and transmits messages via antenna 18. The antenna 18 may be a dedicated antenna to the on-board device 16 or may be a shared antenna with other devices of the vehicle 12.

The vehicle further includes a memory storage device 20 and a global positioning system (GPS) 22. The memory storage device 26 may be integrated as part of the on-board device 16, may be standalone memory, or may be a shared memory. It should be understood that the memory storage device may include any type of memory that is capable of writing and deleting data. The GPS (22) is a device which determines a global position of the vehicle 12.

The infrastructure 14 as described earlier is a fixed entity for providing assistance services to occupants of the vehicle 12. It should be understood that there may be more than one fixed entity if a respective geographical area (e.g., country or state) require an additional dedicated fixed entity. The infrastructure 14 has personnel who communicate with the vehicles for accepting and facilitating the service request of the occupant of the vehicle. The infrastructure 14 communicates with the vehicle using a wireless communication. Typically mobile phone and data communication networks are the communication mediums used to communicate between the infrastructure 14 and the vehicle 12; however, the communication system may utilize other types of communication mediums. The infrastructure 14 is in communication with a map provider entity 24 (e.g., Navteq, TeleAtlas) for providing stop sign maplets and other associated data to the infrastructure 14. The map provider entity 24 may communicate with the infrastructure 14 via wireless communication, landline, closed loop network, fiber optic, or any other communications. The map provider entity 24 provides stop sign maplets to the infrastructure. The stop sign maplets include intersection map data and the other associated data relating to intersections having stops signs or similar for controlling the right of way passage at the intersection. Such information is typically not integrated in most data maps or navigation devices, and must be provided in addition to any geographical maps or turn-by-turn navigation instructions.

Figure 2:
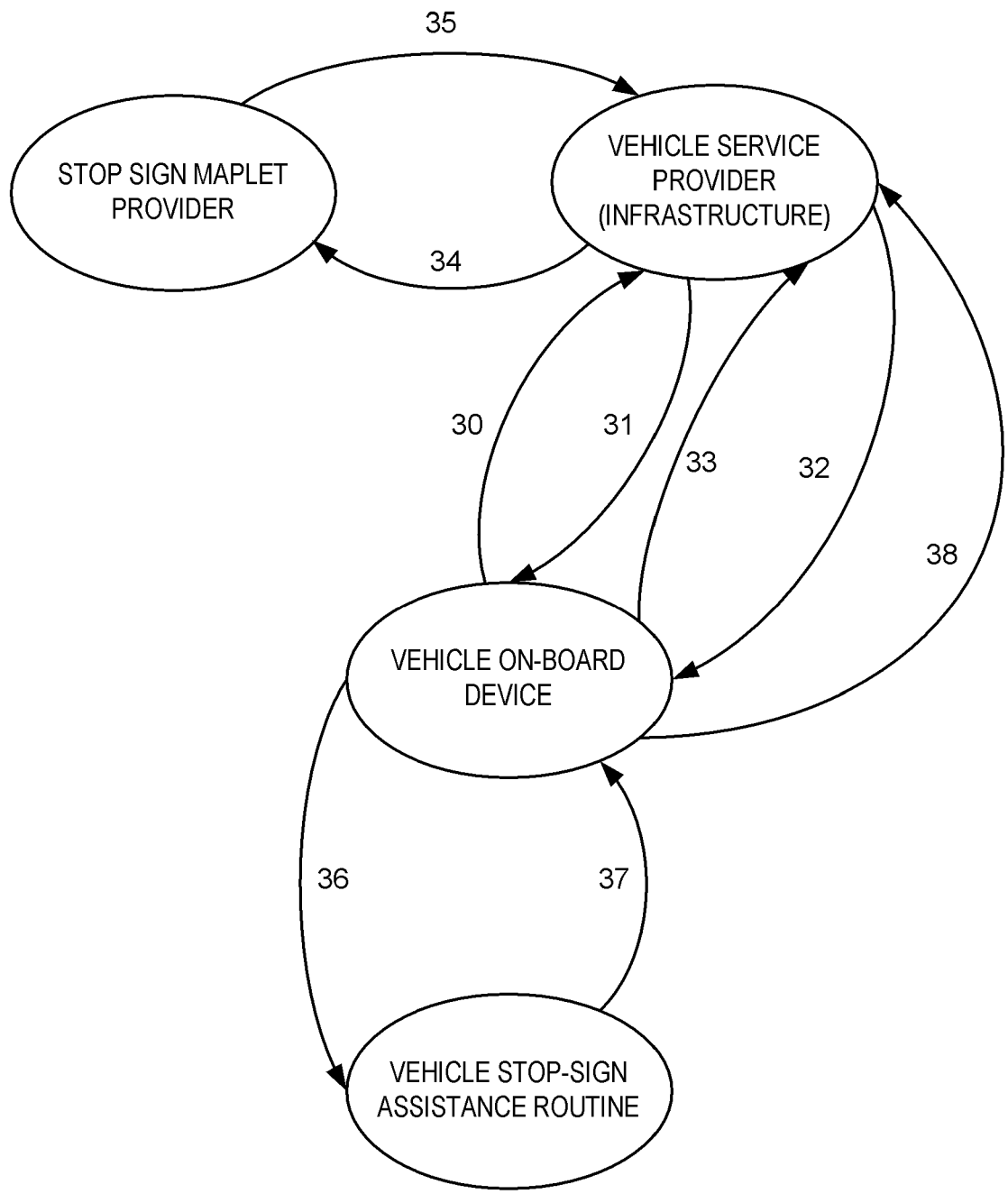
FIG. 2 is an exemplary state diagram for downloading maplet to the vehicle according to an embodiment of the invention.

FIG. 2 is an exemplary state diagram that illustrates a process for managing stop sign maplets provided to a vehicle at the request of turn-by-turn navigation instructions. In step 30, a vehicle having a communication service with the infrastructure initiates a request for turn-by-turn navigation instructions. When a driver initiates a call to the infrastructure, current vehicle data and the vehicle's GPS location are immediately retrieved by the infrastructure. The infrastructure receives the request and generates a set of turn-by-turn instructions.

Figure 3:
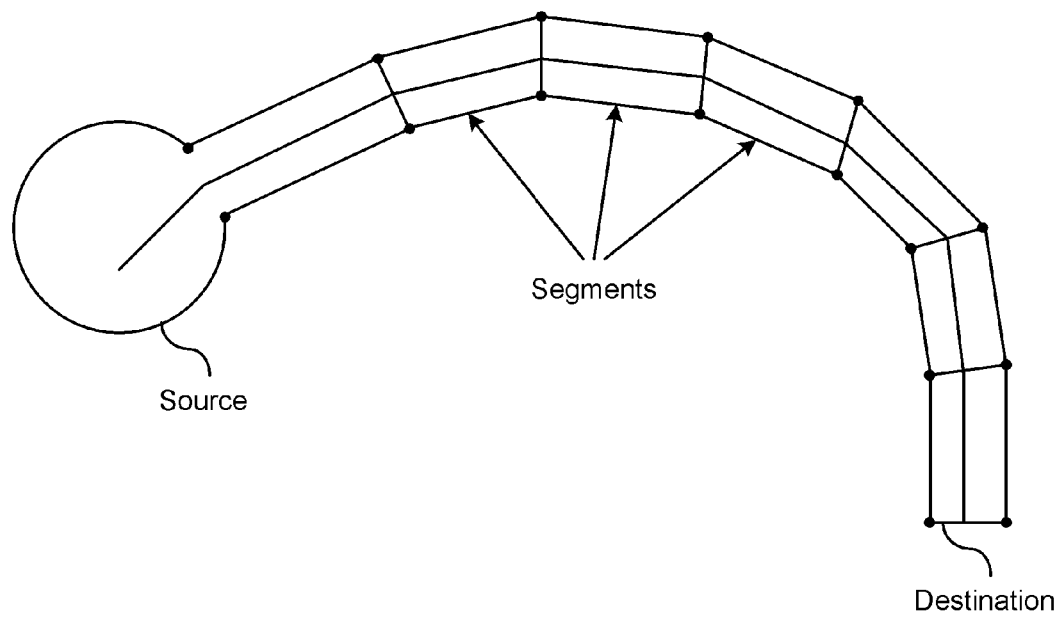
FIG. 3 is an example of turn-by-turn navigation nodal maplet according to an embodiment of the invention.

In step 31, a turn-by-turn navigation maplet is transmitted from the infrastructure to the vehicle. The turn-by-turn navigation maplet includes nodes having unique geographical positioning identifiers in the form of absolute coordinates (i.e., latitude, longitude, and altitude). The nodes form polygons (e.g., geographical regions) as illustrated in FIG. 3. The vehicle receives the turn-by-navigation maplet and compares this to the stop sign maplets already retained in the memory of the vehicle. The stop sign maplets already retained within the memory of the vehicle also have unique geographical positioning identifiers in the form of absolute coordinates. The absolute coordinates of the stop sign maplets are identified by latitude, longitudinal and altitude. As a result, a direct comparison may be made between the identified geographical regions and the stop sign maplets by determining whether any of the stop sign maplets are within the identified geographical regions.

After comparing the stop sign maplets with the identified geographical regions, a determination is made whether any addition stop sign maplets are required. For example, if the no stop sign maplets are located within the identified geographical regions, then in step 32, the on-board device will request from the infrastructure that all stop sign maplets be transmitted to the vehicle. Alternatively, if a determination is made that respective identified geographical regions do not have associated stop sign maplets retained within the memory of the vehicle, then in step 32, the on-board device will request from the infrastructure those respective stop sign maplets relating to the respective identified geographical regions that do not have any associated stop sign maplets. If a determination is made in step 32 that the vehicle memory contains all the stop sign maplets for the all of the identified geographical regions, then no request is made to infrastructure and state flow diagram proceeds to step 36 to execute the stop sign assistance routine for all stop sign locations along the navigation route.

If the determination is made in step 32 that additional stop sign maplets are required by the vehicle, then the infrastructure transmits the stop sign maplets to the vehicle in step 33. It should be understood that process for requesting and transmitting the stop sign maplets may be performed individually or in its entirety. For example, the turn-by-turn maplets transmitted by the infrastructure to the vehicle may be transmitted as segments. If the turn-by-turn maplets are transmitted in segments, only one segment is transmitted to the on-board device in a single transmission. For a segment transmission, a determination is made whether the respective stop sign maplets are retained in memory for the respective segment. The vehicle then communicates to the infrastructure whether stop sign maplets are required for the last transmitted turn-by-turn maplet. Thereafter, a next turn-by-turn segment is transmitted to the vehicle for analyzing whether stop sign maplets associated with the segment are retained within the memory. Steps 31-33 are repeated until the entire navigation route is transmitted. Alternatively, the turn-by-turn navigation maplet for the entire navigation route may be transmitted in its entirety. The on-board device determines whether any stop sign maplets stored in the vehicle memory are associated with the each identified geographical region. A request for the respective stop sign maplets not retained within the vehicle memory is provided to the infrastructure in step 32. The requested stop sign maplets are transmitted from infrastructure to the vehicle in step 33 in response to the request.

In step 36, the vehicle follows the turn-by-turn navigation instructions provided by the infrastructure and executes the stop sign assistance routine for an approaching stop sign along the navigation route. Parameters including vehicle speed, driver braking status, driver sensitivity settings are analyzed in relation to a designated stopping location at the approaching intersection and a warning is issued if the vehicle speed exceeds a threshold for stopping the vehicle the designated stopping location. In step 37, the stop sign assistance routine is repeatedly executed utilizing the associated stop sign maplet for each respective identified geographical location within the navigation route.

In step 37, a message is provided to the on-board device if a stop sign assistance warning is issued or violated. In step 38, the notification of the warning may be transmitted back to the infrastructure if required. Similarly curve speed violation warning and other similar incidents may be transmitted back to the infrastructure if required. The infrastructure may utilize such information to determine where certain intersections and road segments are more susceptible to stop sign and/or curve speed violations and such intersections and road segments may be identified and communicated to the drivers as dangerous intersections as a cautionary warning.

Figure 4:
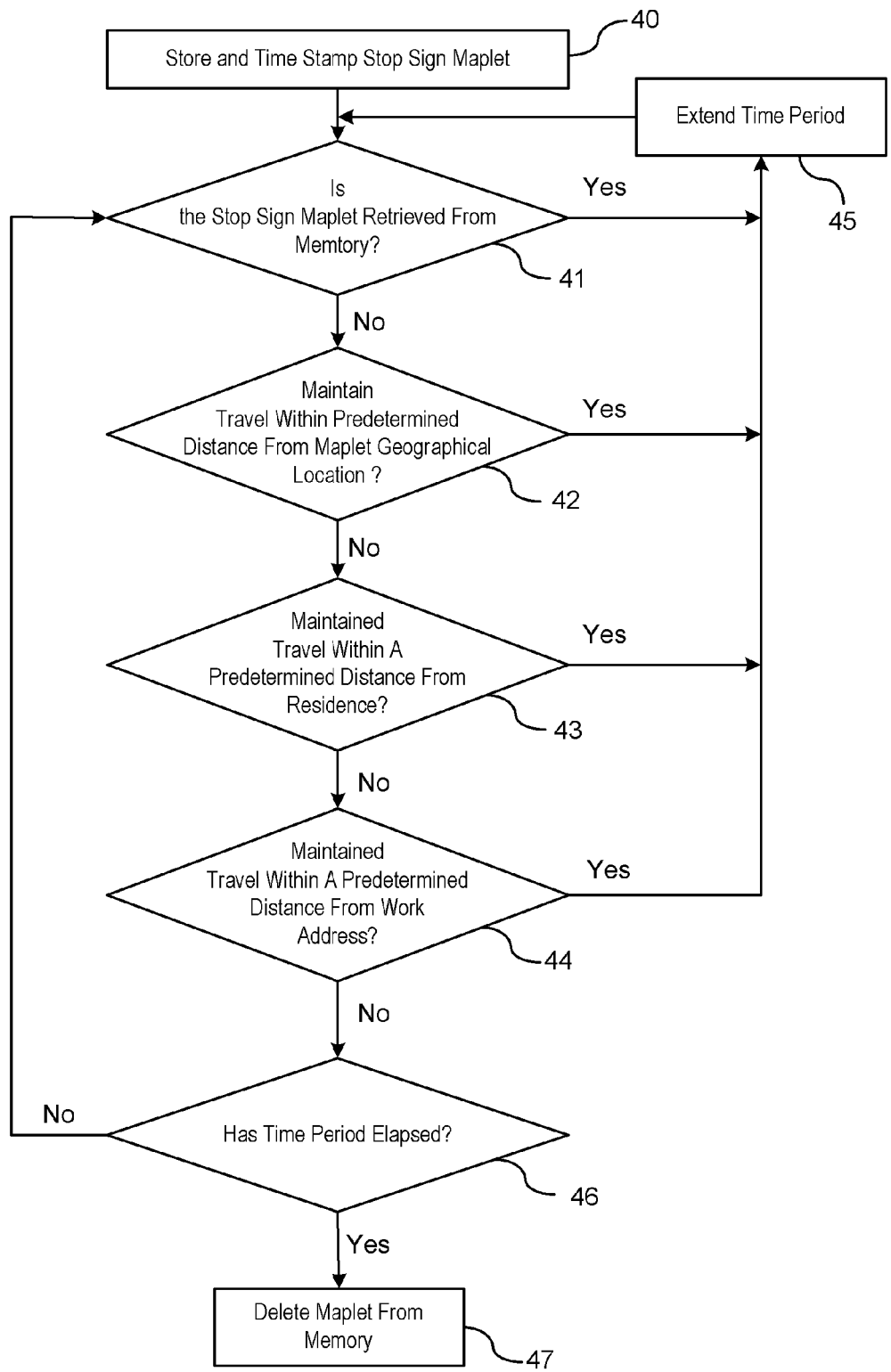
FIG. 4 is a flowchart of a method for retaining stop sign maplets within a memory of the vehicle according to an embodiment of the invention.

FIG. 4 illustrates a flowchart for retaining stop sign maplets within a memory of the vehicle. In step 40, a respective stop sign maplet is stored memory and time stamped. The stop sign maplet is maintained in memory for at least a predetermined period of time. A counter is initiated or other time measure device for determining when and if a respective stop sign maplet may be purged from memory.

In step 41, a determination is made whether the stop sign maplet is retrieved from memory prior to the time period expiring. If the determination is that the stop sign maplet is retrieved from memory during the predetermined time period, then the routine advances to step 46 where the stop sign maplet is maintained in memory for an extended period of time. The extended period of time may be additional time added to the predetermined period of time or the predetermined period of time may be reset so that the full length of the period runs anew. If the stop sign maplet is not retrieved from memory during the predetermined period of time, the routine advances to step 42.

In step 42, a determination is made whether the vehicle maintains travel within a respective distance from the geographic location associated with the stop sign maplet. If the determination is made that the vehicle maintains travel within a respective distance from the geographic location associated with the stop sign maplet, then the routine advances to step 46 where the stop sign maplet is maintained in memory for an extended period of time. If the vehicle travels outside of the respective distance from the geographic location associated with the stop sign maplet, then the routine advances to step 43.

In step 43, a determination is made whether the vehicle maintains travel within a respective distance from a residence address stored in the memory of the vehicle. If the determination is that the vehicle maintains travel within a respective distance from a residence address stored in the memory of the vehicle, then the routine advances to step 45 where the stop sign maplet is maintained in memory for an extended period of time. If the vehicle travels outside of a predetermined distance from the residence address stored in the memory of the vehicle, then the routine advances to step 44.

In step 44, a determination is made whether the vehicle maintains travel within a respective distance from a secondary address stored in the memory of the vehicle. The secondary address may be a work address or may be an address entered by a user that the vehicle frequently maintains travel to. If the determination is made that the vehicle maintains travel with a respective distance from the secondary address stored in the memory of the vehicle, then the routine advances to step 45 where the stop sign maplet is maintained in memory for an extended period of time. If the vehicle travels outside of a predetermined distance from the secondary address stored in the memory of the vehicle, then the routine advances to step 46.

In step 46, a determination is made whether the period of time has elapsed. If the determination is made that the period of time has not elapsed, then the routine advances back to step 41 to re-determine if any of the criteria for extending the period of time is met. If the determination is made that the period of time has elapsed, then the routine advances to step 47.

In step 47, the respective stop sign maplet is deleted from memory.

While certain embodiments of the present invention have been described in detail, those familiar with the art to which this invention relates will recognize various alternative designs and embodiments for practicing the invention as defined by the following claims.

What is claimed is:

1. A method of managing map data for intersections having stop sign indicators, the method comprising the steps of:
    initiating a request for turn-by-turn navigation instructions for a destination from a vehicle to an infrastructure;
    transmitting a turn-by-turn navigation maplet from the infrastructure to the vehicle;
    identifying a geographical region associated with the received turn-by-turn navigation maplet;
    determining whether stop sign locations already retained within a memory of the vehicle relate to the identified geographical region;
    if the stop sign locations retained within the memory of the vehicle do not relate to the identified geographical region, then the vehicle on-board device requests stop sign maplets for the identified geographical regions from the infrastructure; and
    transmitting the stop sign maplets for the identified geographical region from the infrastructure to the vehicle, the stop sign maplets relating to stop sign intersection data within the identified geographical region.

2. The method of claim 1 further comprising the steps of the on-board device receiving the stop sign maplets transmitted by the infrastructure, and the vehicle on-board device utilizing the stop sign maplets to apply a stop sign assistance routine for determining whether the vehicle speed exceeds a threshold for stopping the vehicle at the designated stopping location.

3. The method of claim 2 further comprising the step storing the stop sign maplets in the memory of the vehicle.

4. The method of claim 3 wherein a stop sign maplet is protected from being deleted from memory during a retention period comprised of a predetermined number of days, and wherein the stop sign maplet is deleted from memory after the retention period has expired.

5. The method of claim 4 wherein the retention period is extended for an additional predetermined period of time if the respective stop sign maplet is retrieved from the memory of the vehicle within a second predetermined number of days since a last usage.

6. The method of claim 4 wherein the retention period is extended for an additional predetermined period of time if the vehicle maintains travel within a predetermined distance from any of the intersections identified by the stop sign maplet.

7. The method of claim 4 wherein the retention period is extended for an additional predetermined period of time if the vehicle maintains travel within a predetermined distance for a residence address stored in the memory.

8. The method of claim 4 wherein the retention period is extended for an additional predetermined period of time if the vehicle maintains travel within a predetermined distance a secondary address stored in the memory.

9. The method of claim 1 wherein the stop sign maplets further include speed limit data for the identified geographical region.

10. The method of claim 9 wherein the stop sign location and speed limit data from the stop sign maplets are used to determine whether a stop sign assistance warning should be issued to a driver of the vehicle.

11. The method of claim 9 wherein the speed limit data is used to determine whether a curve speed driver assistance warning should be issued to a driver of the vehicle.

12. The method of claim 1 wherein the turn-by-turn navigation maplet includes a segment of the navigation route, wherein a plurality of turn-by-turn navigation maplets are transmitted to the vehicle, wherein each respective turn-by-turn navigation maplet has a respective geographical region identifier and wherein a determination is made whether respective stop sign locations already retained within the memory of the vehicle relate to the geographical region identifier.

13. The method of claim 1 wherein the turn-by-turn navigation maplet transmitted to the vehicle includes the entire navigation route as a single entity, wherein the turn-by-turn navigation maplet includes respective geographical region identifiers, and wherein a determination is made whether respective stop sign locations are already retained within the memory of the vehicle for the respective geographical region identifiers.

14. The method of claim 1 wherein the turn-by-turn navigation maplet transmitted to the vehicle comprises a set of nodes each having a geographical positioning identifier.

15. A system for managing map data for intersections having stop sign indicators, the system comprising:
an infrastructure having a communication system for communicating with vehicles over a wireless communication network, the infrastructure of maintaining a position of vehicles within the wireless communication network, the infrastructure providing turn-by-turn navigation assistance to vehicles in the wireless communication network;
a vehicle having an on-board device for communicating with the infrastructure over the wireless communication network, the on-board device enabling a communication channel with the infrastructure for requesting the turn-by-turn navigation assistance, the on-board navigation device further processing turn-by-turn navigation data received from the infrastructure;
wherein the on-board device receives a turn-by-turn navigation maplet from the infrastructure, wherein the on-board device identifies a geographical region associated with the received turn-by-turn navigation maplet, wherein the on-board device determines whether stop sign maplets already retained within a memory of the vehicle relates to the identified geographical region, wherein the vehicle on-board device requests stop sign maplets for the identified geographical regions from the infrastructure if the stop sign maplets retained within the memory of the vehicle do not relate to the identified geographical region, and wherein the requested stop sign maplets for the identified geographical region are transmitted from the infrastructure to the on-board device.

16. The system of claim 15 wherein the turn-by-turn navigation maplet transmitted to the vehicle comprises a set of nodes each having a geographical positioning identifier.

17. The system of claim 15 wherein the plurality of turn-by-turn navigation maplets representing respective segments of the navigation route are transmitted to the vehicle, wherein each respective turn-by-turn navigation maplet includes a set of nodes each having geographical positioning identifiers, wherein a determination is made for each respective geographical region whether respective stop sign maplets are already retained within the memory of the vehicle relating to the identified geographical regions, and wherein the on-board device requests stop sign maplets for respective geographical regions not retained in the memory of the vehicle.

18. The system of claim 15 wherein the turn-by-turn navigation maplet transmitted to the vehicle represents the entire navigation route as a single entity, wherein the turn-by-turn navigation maplet includes a plurality of nodes having geographical positioning identifiers that identify respective geographical regions making up the navigation route, wherein a determination is made for each respective geographical region whether respective stop sign maplets are already retained within the memory of the vehicle relating to the identified geographical regions, and wherein the on-board device requests stop sign maplets for the respective geographical region not retained in the memory of the vehicle.

19. The system of claim 15 further comprising a stop sign assistance program for analyzing a vehicle speed in relation to a designated stopping location at an intersection, wherein the stop sign assistance program enables a warning in response to the vehicle speed exceeding a threshold for stopping the vehicle at the designated stopping location.

20. The system of claim 15 wherein the on-board device protects a respective stop sign maplet from being deleted from in memory for a predetermined number of days after receiving the respective stop sign maplet, and wherein the stop sign maplet is deleted from memory after a retention period has expired.

21. The system of claim 20 wherein the on-board device extends the retention period for an additional predetermined period of time if the respective stop sign maplet is retrieved from memory within a second predetermined number of days since a last usage.

22. The system of claim 20 wherein the on-board device extends the retention period for an additional predetermined period of time if the vehicle maintains travel with the predetermined distance from the respective map data region.

23. The system of claim 20 wherein the on-board device extends the retention period for an additional predetermined period of time if the vehicle maintains travel with a predetermined distance of a residence address stored in memory.

24. The system of claim 15 wherein the stop sign maplets further includes speed limit data for the identified geographical region.

25. The system of claim 24 wherein the speed limit data includes curve speed limits that are used to determine whether a curve speed driver assistance warning should be issued to a driver of the vehicle.

* * * * *